United States Patent
Marmigere et al.

(10) Patent No.: US 7,552,220 B2
(45) Date of Patent: Jun. 23, 2009

(54) SYSTEM AND METHOD TO REFRESH PROXY CACHE SERVER OBJECTS

(75) Inventors: Gerard Marmigere, Drap (FR); Joaquin Picon, St. Laurent du Var (FR); Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/639,694

(22) Filed: Aug. 12, 2003

(65) Prior Publication Data

US 2004/0068579 A1 Apr. 8, 2004

(30) Foreign Application Priority Data

Aug. 13, 2002 (EP) ................... 02368085

(51) Int. Cl.
  *G06F 15/16* (2006.01)
(52) U.S. Cl. .................. 709/228; 709/227; 709/201; 709/202; 709/203
(58) Field of Classification Search ......... 709/201–203, 709/227, 228
See application file for complete search history.

(56) References Cited

U.S. PATENT DOCUMENTS

| | | | | |
|---|---|---|---|---|
| 5,881,229 | A * | 3/1999 | Singh et al. .................. | 709/203 |
| 5,915,112 | A * | 6/1999 | Boutcher .................... | 719/330 |
| 6,256,632 | B1 * | 7/2001 | Fraenkel et al. .............. | 707/10 |
| 6,330,591 | B1 * | 12/2001 | Ducaroir et al. .............. | 709/213 |
| 6,493,768 | B1 * | 12/2002 | Boutcher .................... | 719/330 |
| 6,510,439 | B1 * | 1/2003 | Rangarajan et al. ......... | 707/201 |
| 6,678,799 | B2 * | 1/2004 | Ang ........................... | 711/141 |
| 6,792,462 | B2 * | 9/2004 | Bernhardt et al. ........... | 709/225 |
| 6,792,507 | B2 * | 9/2004 | Chiou et al. ................. | 711/119 |
| 6,879,981 | B2 * | 4/2005 | Rothschild et al. ............ | 707/8 |
| 6,883,135 | B1 * | 4/2005 | Obata et al. ................. | 715/500 |
| 6,941,310 | B2 * | 9/2005 | Ahad et al. ................. | 707/100 |
| 6,963,953 | B2 * | 11/2005 | Nakajima ................... | 711/129 |
| 6,985,953 | B1 * | 1/2006 | Sandhu et al. .............. | 709/229 |

(Continued)

OTHER PUBLICATIONS

Fielding et al. RFC 2616. Hypertext Transfer Protocol—HTTP/1.1. http://www.faqs.org/ftp/rfc/rfc2616.pdf. Sections 6.1.1, 10.5.2, 13.3.*

*Primary Examiner*—Kenny S Lin
*Assistant Examiner*—Hieu T Hoang
(74) *Attorney, Agent, or Firm*—Norman L. Gundel; Hoffman Warnick LLC

(57) ABSTRACT

A method and computing systems for refreshing objects stored by a Proxy cache server from Web content servers. The refresh is requested by the Proxy cache server only if the expiration date attached to a stored object has expired. The refresh of one object is requested by the Proxy cache server to the Web content server upon a request from the browser of a client device. Additionally, the Proxy cache server can send a Refresh_request command to the Web content servers applying to a list of objects for which the expiration date has expired. The refreshed objects are not sent by the Web content server if the last modified date has changed but rather if, and only if, the object content, identified by a signature, has been changed. This method and system have the advantage of offloading the computing resources involved for data transfer through the network connecting the servers.

11 Claims, 12 Drawing Sheets

U.S. PATENT DOCUMENTS

| | | | |
|---|---|---|---|
| 7,039,673 B1* | 5/2006 | Abbott et al. | 709/203 |
| 7,159,014 B2* | 1/2007 | Kausik et al. | 709/214 |
| 2001/0049685 A1* | 12/2001 | Carey et al. | 707/103 R |
| 2002/0103804 A1* | 8/2002 | Rothschild et al. | 707/10 |
| 2002/0165912 A1* | 11/2002 | Wenocur et al. | 709/203 |
| 2002/0172207 A1* | 11/2002 | Saito et al. | 370/400 |
| 2002/0188665 A1* | 12/2002 | Lash | 709/203 |
| 2003/0033283 A1* | 2/2003 | Evans et al. | 707/1 |
| 2003/0061272 A1* | 3/2003 | Krishnamurthy et al. | 709/203 |
| 2003/0074425 A1* | 4/2003 | Kawakita | 709/219 |
| 2003/0110296 A1* | 6/2003 | Kirsch et al. | 709/246 |
| 2003/0182408 A1* | 9/2003 | Hu | 709/223 |
| 2003/0188106 A1* | 10/2003 | Cohen | 711/133 |
| 2003/0195862 A1* | 10/2003 | Harrell, Jr. | 707/1 |
| 2003/0204602 A1* | 10/2003 | Hudson et al. | 709/228 |
| 2004/0003101 A1* | 1/2004 | Roth et al. | 709/231 |
| 2004/0015504 A1* | 1/2004 | Ahad et al. | 707/100 |

* cited by examiner

| Server | Agent support |
|---|---|
| www.ibm.com | Yes |
| www.yahoo.com | No |
| www.xxx.com | Yes |
| www.yyy.com | Yes |
| www.zzz.com | No |

200

| Object_ID | MD5 | Filename | URL | Expiration date | Last Modified date |
|---|---|---|---|---|---|
| /x1 | Sx12 | /cache/x1 | www.ibm.com/x1 | 2002/07/20 | |
| /x2 | Sx21 | /cache/x2 | www.yahoo.com/x2 | 2002/07/20 | |
| /x3 | Sx32 | /cache/x3 | www.ibm.com/x3 | 2002/07/20 | |
| /x4 | Sx41 | /cache/x4 | www.ibm.com/x4 | 2002/07/20 | |
| /x5 | Sx51 | /cache/x5 | www.ibm.com/x5 | 2002/07/20 | |
| /y1 | Sy11 | /cache1/y1 | www.yahoo.com/y1 | 2002/07/20 | |

Table 500:

| Object_ID | MD5 | Filename | URL | Expiration date | Last Modified date |
|---|---|---|---|---|---|
| /x1 | Sx12 | /cache/x1 | www.ibm.com/x1 | 2002/07/20 | |
| /x2 | Sx21 | /cache/x2 | www.yahoo.com/x2 | 2002/07/20 | |
| /x3 | Sx32 | /cache/x3 | www.ibm.com/x3 | 2002/07/20 | |
| /x4 | Sx41 | /cache/x4 | www.ibm.com/x4 | 2002/07/20 | |
| /x5 | Sx51 | /cache/x5 | www.ibm.com/x5 | 2002/07/20 | |
| /y1 | Sy11 | /cache1/y1 | www.yahoo.com/y1 | 2002/07/20 | |

Table 510:

| Object_ID | MD5 | Filename | URL | Expiration date | Last Modified date |
|---|---|---|---|---|---|
| /x1 | Sx12 | /cache/x1 | www.ibm.com/x1 | 2002/08/16 | |
| /x2 | Sx21 | /cache/x2 | www.yahoo.com/x2 | 2002/08/16 | |
| /x3 | Sx33 | /cache/x3 | www.ibm.com/x3 | 2002/08/12 | |
| /x4 | Sx42 | /cache/x4 | www.ibm.com/x4 | 2002/08/12 | |
| /x5 | Sx51 | /cache/x5 | www.ibm.com/x5 | 2002/08/16 | |
| /y1 | Sy11 | /cache1/y1 | www.yahoo.com/y1 | 2002/07/20 | |

FIGURE 5

| CODE | DESCRIPTOIN | ACTION ON CACHE INDEX |
|---|---|---|
| 200 | OK | |
| 301,302 ,307 | Redirect | replace Expiration_date, signature and data |
| 304 | Not modified | remove entry |
| 404 | Not found | replace Expiration_date |
| | | remove entry |

FIGURE 9

SYSTEM AND METHOD TO REFRESH PROXY CACHE SERVER OBJECTS

FIELD OF THE INVENTION

The present invention generally relates to Proxy cache servers; more particularly, the present invention concerns the refreshing of a Proxy cache server with an updated set of objects from a Web content server.

BACKGROUND OF THE INVENTION

The World Wide Web offers to users the opportunity to access millions of documents which are on thousands of Web content servers. Access to these documents is performed by a Web browser operating on a client device. The Web browser provides the user with a simple look and feel. Behind this simple user view, a large infrastructure is deployed to allow access to any document resident on a Web content server. The response to a request issued by a user may take a long time, particularly when the Web content server is located far away from the requester site, is connected through a network link with low performance, or is heavily loaded. The requested document has to be transferred through the network at each request, thus requiring high network performance, especially if the objects have a very large size.

One way to minimize the response time and to decrease the network loading is to have a Proxy cache server located near the user. The role of a Proxy cache server is to intercept a request for information from a Web content server and to verify if the requested document or object is locally available and, if this is the case, to use this local copy instead of the original that is stored on the Web content server.

Typically, the most common Proxy servers cache a particular page only after a user requests it. However, specified URLs (pages or more generally Web objects) may be pre-fetched in the cache before they are effectively requested by a user as follows:
  Load specific URLs defined by the administrator.
  Load the most popular URLs from the previous day's activity.
  The refresh process can also follow a specified level of HTML links to objects in the document and caches all the linked objects (delving method).

The standardized protocol supporting the flow between a client and server transferring hypertext or hypermedia Web information is the Hyper Text Transport Protocol (HTTP). In an HTTP command to request information from a client browser to the Proxy cache server or from the Proxy cache server to the Web content server, only one object can be obtained at a time.

Even if they have been already stored in the memory of the Proxy cache server, the objects need to be regularly refreshed because they are updated in the Web content servers and are no longer valid in the Proxy cache server. The refresh operation is performed either 'on the fly' upon a request of a client device browser or during refresh operations periodically started, most of time during the night, by the Proxy cache server.

One problem with the operation of refreshing Proxy cache servers from Web content servers is the amount of information to be downloaded.

A first solution exists to reduce the amount of information downloaded from the Web content servers to refresh the Proxy cache server. The Proxy cache server first stores, for each object, an expiration date which is considered as the limit date of validity of an object. Some objects such as stock values are never cached. If this object is relevant to the news, the expiration date is the same day because this information is updated in the Web content servers more than once a day. If the object is a recipe it can be kept a few months without being considered as invalid. Another type of information stored for each object in the Proxy cache server is the 'last modified' date: this is a date sent by the Web content server attached with the object indicating the last time the object has been updated in the Web content server. When information requested by a client device browser is found in the memory of the Proxy cache server with an exhausted expiration date, the Proxy cache server issues a special request known as "if -modified-since." The Proxy cache server sends a 'last modified' date along with the object to be refreshed. The Web content server compares the 'last modified' date of the object with the date attached to the version of the object currently stored in the Web content server. The Web content server sends back the object to the Proxy cache server only if the object has been modified since it was last received by the Proxy cache. This solution is currently used by products implementing the RFCs describing the HTTP/1.1 protocol, for instance, currently, the RFC 2616. One software product implementing this refresh method is the IBM Web Traffic Express for Multiplatforms.

The solution of the prior art reduces efficiently the amount of information downloaded by a Web content server to the Proxy cache server during a cache refresh operation because only the objects which have been updated on the Web content servers are sent to the Proxy cache server. However, this solution generates one couple of request/responses under HTTP protocol, for instance, for each object to be refreshed in the cache. This has an impact on the traffic load through the network. A second impact is that the modification of an object on the Web content server is detected by the date of last update. This date indicates when the document has been last saved on the Web content server, but does not give any insurance about the content modification. Consequently, refresh operations may be performed on objects which have been replaced on the Web content server but have not been really modified since the last date of refresh. In consequence, objects could be uselessly sent to the Proxy cache server. Saving useless object refresh operations is particularly relevant when more than one object is refreshed at a time and when the size of objects is large.

SUMMARY OF THE INVENTION

It is therefore an object of the present invention to provide a method and system to have a Proxy cache server refreshed by Web content servers while limiting the workload on the computing resources including the network resources.

The objects of the invention are reached by a method for refreshing objects stored in a Proxy cache server, with new versions of objects stored by Web content servers communicating with messages through a network with the Proxy cache server, the Proxy cache server and the Web content servers supporting a standard request for one object and a standard refresh request for one object based on a last modified date, said method comprising the steps of:
  storing, in the Proxy cache server, a cache index table containing, for each object stored, an identification of the object, a file name of the object in the Proxy cache server, a network address of the Web content server owning the object, an object validity expiration date and a signature identifying the object content;
  reading the cache index table and, selecting one object for which the expiration date is exhausted;

sending from the Proxy cache server to the Web content server address owning the selected object, a Refresh_request command in a payload of a message, an argument of the message being the object identifier and the object signature;

receiving from the Web content server a Refresh_response command in the payload of a message, arguments of the message being the object identifier and, if the signature of the object stored in the Web content server is different from the signature in the Refresh_request, the object stored in the Web content server, its signature and the new expiration date;

updating, in the Proxy cache server, the cache index table with the new signature and expiration date of the object and updating the object file name with the object received from the Web content server.

In the Refresh-response sent by the Web content servers, status codes such as the HTTP status codes can be used as additional arguments. The Proxy cache server receiving the Refresh_response command update the object, the cache index table and the web content table according to the code value.

In one preferred embodiment, the standardized HTTP protocol is used for all the exchanges between the servers.

The method is implemented by an agent operating in the Proxy cache server and an agent operating or not in the Web content servers. The Proxy cache agent is able to learn if a refresh agent is installed in a Web content server and the method includes also the support for the object request/response operations under the standard protocols.

By limiting the refresh to the objects which have been really modified in the Web content servers, the amount of data exchanged between the Proxy cache server and the Web content servers is reduced. By grouping transfer of objects in object lists in the Refresh_request and Refresh_response commands, the traffic between the Proxy cache server and Web content servers is also reduced.

One other advantage of the solution is that it can be implemented while using a standard transfer protocol such as HTTP between the client device, the Proxy cache server and the content servers and thus without changing the initial transfer protocol flows.

BRIEF DESCRIPTION OF THE DRAWINGS

FIG. 2 illustrates the two tables stored on the Proxy cache server to manage the Web objects, which are the Web_contentServer_table and the Cache_index_table, according to the preferred embodiment;

FIG. 5 illustrates the Cache_index_table located in the Proxy cache server before and after refresh by the Web content server according to the preferred embodiment;

FIG. 9 summarizes the meaning of the codes in the syntax of information exchanged for the refresh between the Web content server and the Proxy cache server according to the preferred embodiment;

DETAILED DESCRIPTION OF THE INVENTION

Figure 1:
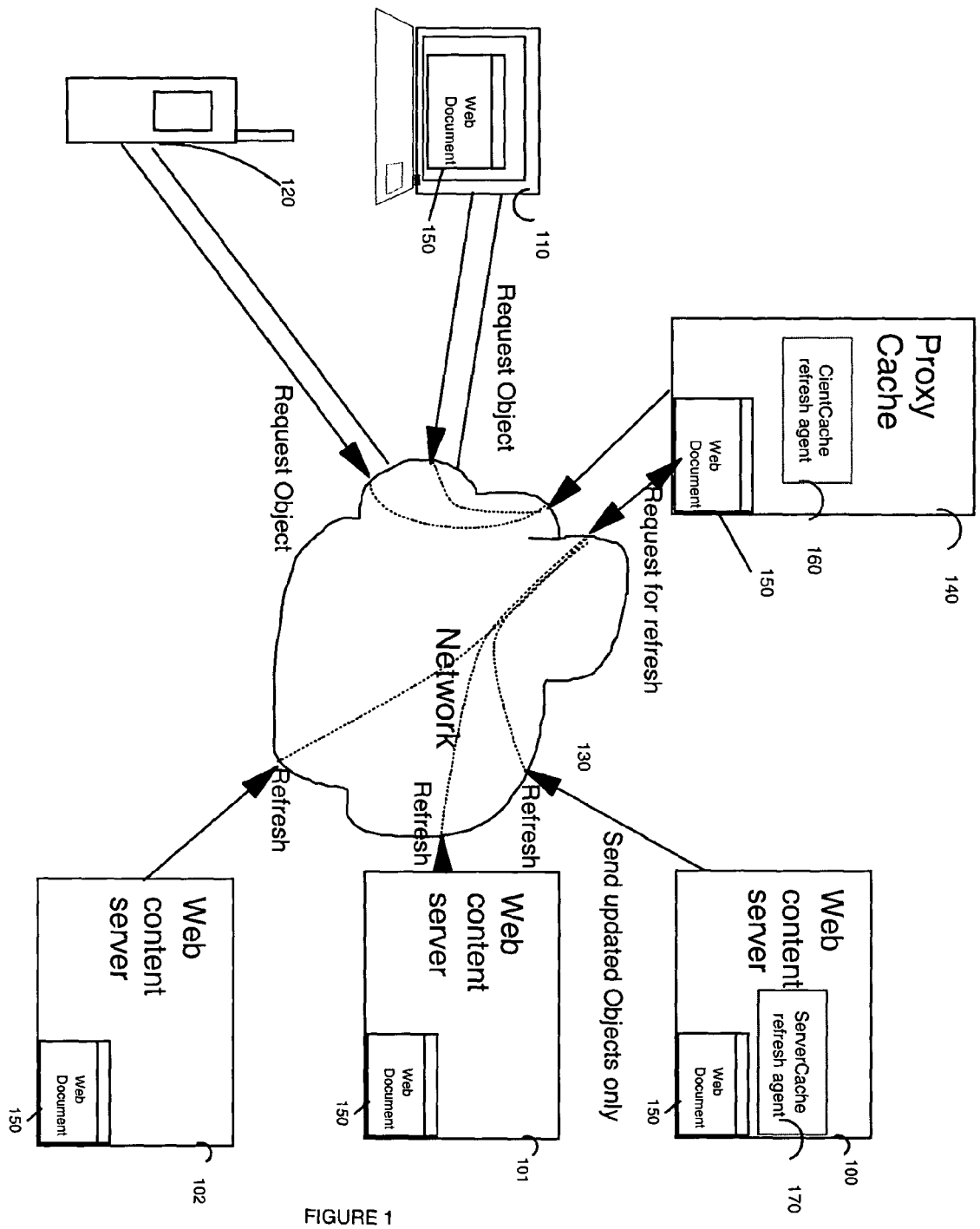
FIG. 1 illustrates the computing environment of the preferred embodiment.

FIG. 1 is a description of the environment of the invention. Web content servers (100, 101, 102) provide Information services to client devices (110, 120) through a network (130) which could be Internet and which may include mobile communications. An Internet client device (110, 120) uses a Web browser to send a request to the Web content server for accessing information which could be any type of object such as a HTML page or an image file (JPG, GIF etc . . . ) or an audio file (WAV, MP3 etc.), etc. forming what is generally called a Web document (150). The request is not directly sent to the Web content servers but is sent to a Proxy cache server (140). A Proxy cache server, intermediate between the client devices and Web content servers, receives the request from the client device, asks the Web content servers for the missing information or for the refreshed information and sends the requested information to the client. Proxy cache servers, which were first used for security reasons, have auxiliary storage to store the Web objects forming the Web documents mostly used by the client devices. This reduces the delay time to send the Web information to the client devices. Using HTTP, a request from the client device is received by the Proxy cache server and resent by the Proxy cache server to the Web content servers if the information is not stored in its Proxy cache memory or if it is a too old version of the information. The transfer of the answer is forwarded from the Web content server to the client through the Proxy cache server in the same way as the request.

Figure 3:
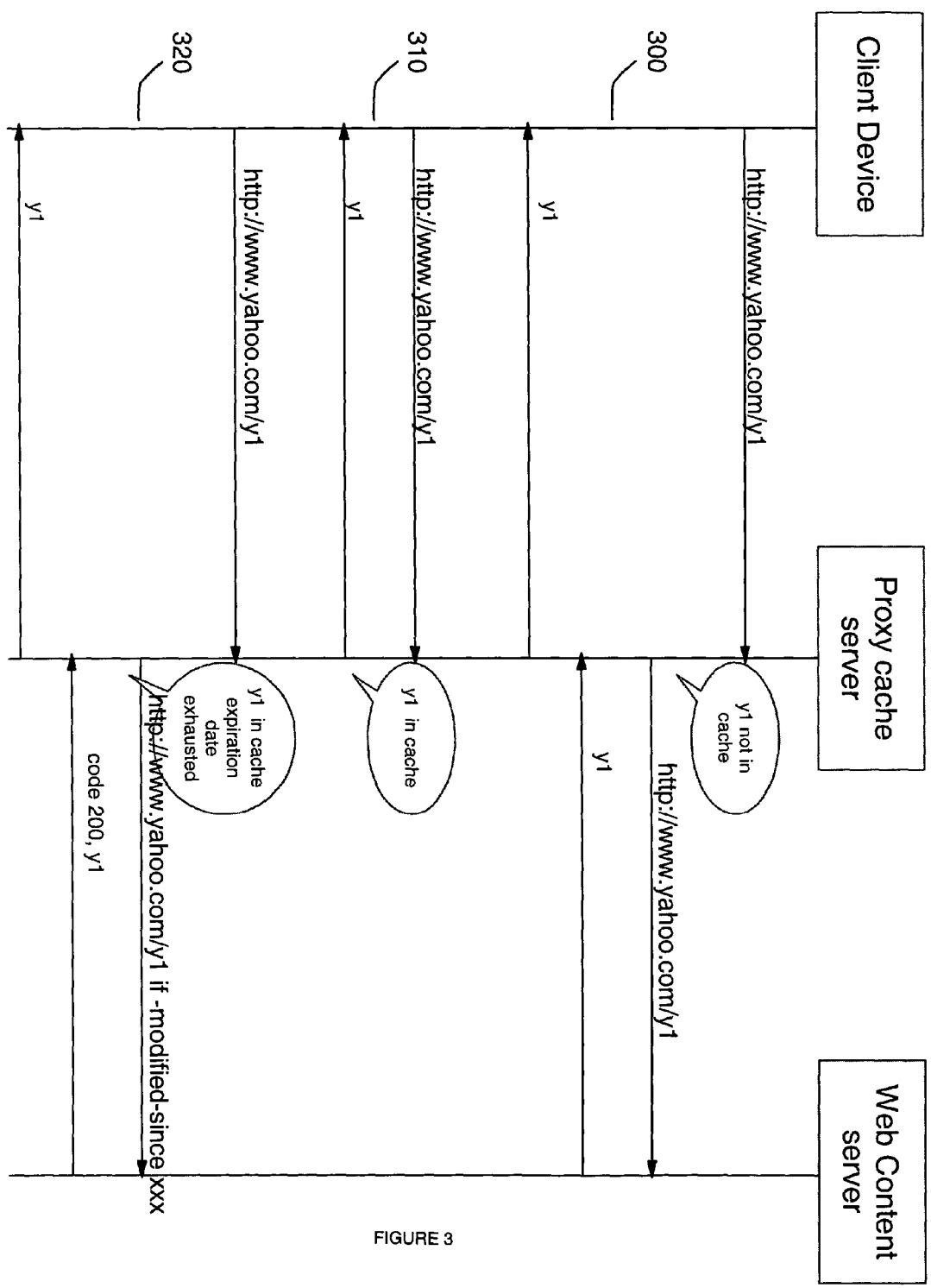
FIG. 3 shows the flow to get a Web object and update the Proxy cache server according to the prior art.

With the solution of the prior art, as described in reference to FIG. 3, the Proxy cache server operating, for instance the IBM Web Traffic Express, sends a request for refresh to the Web content server (101, 102) because the expiration date of the information requested has exhausted. The Web content server (101, 102) sends back the level of the objects that it stores.

According to the preferred embodiment and as described in FIG. 1, a Client cache refresh agent (160) is operating on the Proxy cache server and a Server cache refresh agent (170) operates on the Web content server. These refresh agent handles the Refresh_request and Refresh_response commands according to the preferred embodiment. The Server cache refresh agent on the Web content server is able also to notify the Client cache refresh agent of the Proxy cache server that it is operating.

FIG. 2 illustrates the two tables maintained in the Proxy cache server by the Client cache refresh agent according to the preferred embodiment.

The Proxy cache server tables are the Web_contentServer_table (200) and the Cache_index_table (210). The Web_contentServer_table is used for storing the server name, or server IP address, for at least one object resident in the Proxy server cache auxiliary memory. In this table is also stored an indication (Yes or No) if a specified Web content server operates or not a Server_cache_refresh_agent (170). The Cache_index_table (210) is maintained by the Proxy cache server to associate to each URL an Object signature which is a 'digest', a code identifying the content of a text which is used for security. MD5 is a one-way hash giving a reduced representation of the object. The MD5 signature allows identification of a large text with a good level of security. Any other 'digest' can be used for the preferred embodiment. The Proxy cache server stores Object IDs identifying objects: the identification can be a short ID or the URL (Universal Resource Locator) which is the Web address or, more advantageously, one part of the URL (for instance/y1), the remaining part of the URL being the address of the server (for instance www.yahoo.com) which is already stored. The Object Ids are used in the flow between the Web content server and the Proxy cache server respectively operating the ServerCache_refresh_agent and the Client_cache_refresh agent according to the preferred embodiment. The computed signature, the file name containing the object itself, the expiration date, and the local URL identifying the Web address of the Internet or Intranet origin Web content server having provided the Web documents containing the objects are stored for each Object ID. The 'last modified date' of the object is stored as well in this table for compatibility with Web content servers which do not implement the ServerCache refresh agent according to the preferred embodiment. As described in reference to FIG. 3, the Web content servers of the prior art do use the last modified date.

It is noted that all the dates stored in the tables by the server in the solution of the prior art or in the preferred embodiment are usually timestamps rather than calendar dates as illustrated in the figures of the preferred embodiment. It is evident that with timestamps instead of calendar dates, the refresh operations based on the exhaustion of a date can be performed more than once a day. As explained above, some Web information such as the weather or the news are refresh more than once a day. For the simplicity of the illustration of the preferred embodiment all the dates in the figures are calendar dates having the 'YYYY/MM/DD' format.

Figure 4:
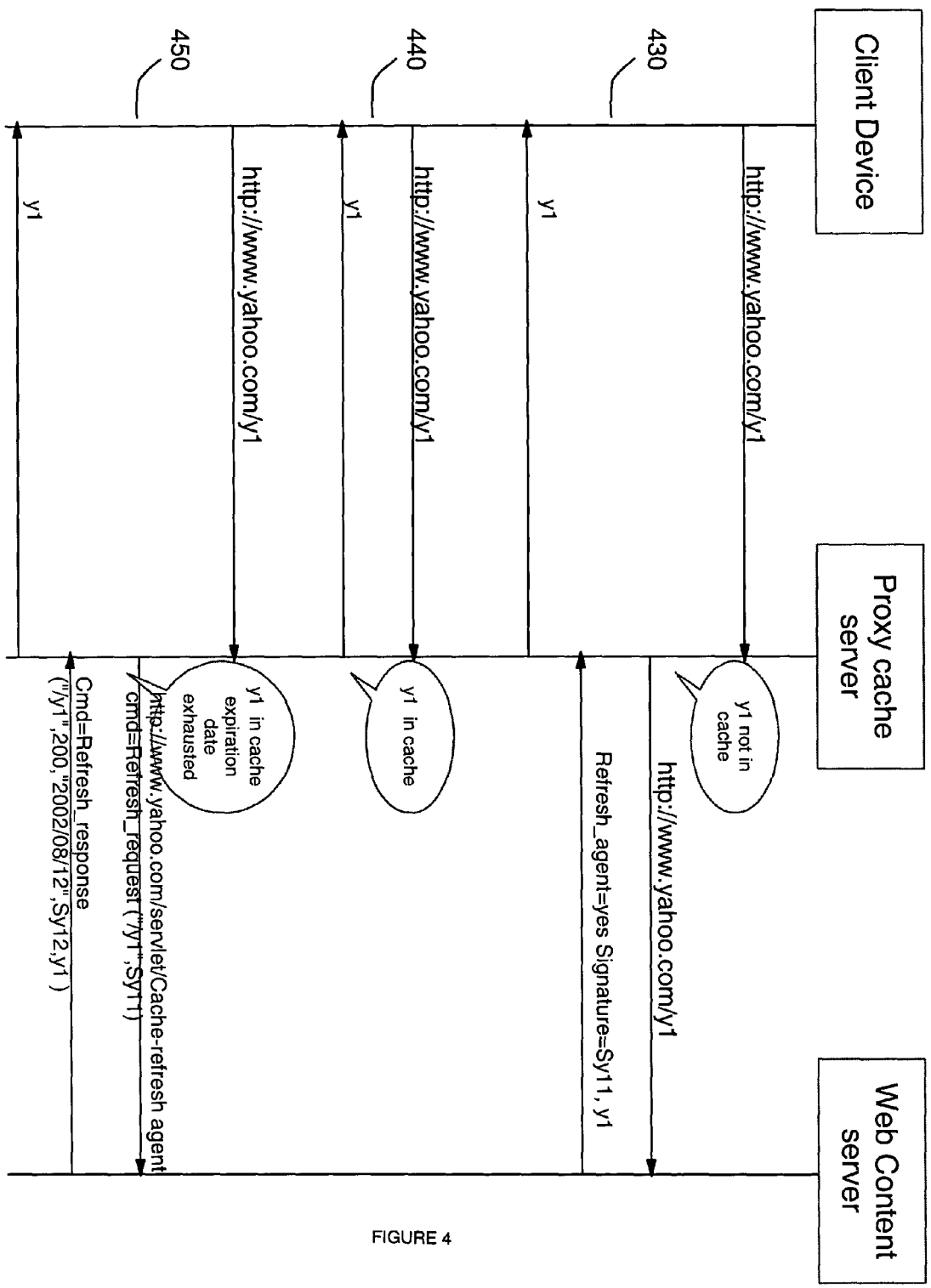
FIG. 4 shows the flow to get a Web object from a Web content server and update the Proxy cache server according to the preferred embodiment when a client cache refresh agent operates on the Proxy cache server and a Server cache refresh agent operates on the Web content server.

FIG. 3 shows the flows between the client device and a Proxy cache server and between the Proxy cache server and a Web content server in the prior art solution. These are also the flows supported by the Client_cache_refresh_agent according to the preferred embodiment when a Server_cache_refresh_agent does not operate on the Web content server. This prior art solution is described when using the HTTP protocol. A client device requests an object (as an example URL "www.yahoo.com/y1")(300). The Proxy cache server performs a lookup in its cache index which stores the object URLs and their respective addresses on the auxiliary storage, does not find the object, so, forwards the request to the target Web content server or to another Proxy cache server in case of cascaded Proxy cache servers. The Web content server returns to the Proxy cache server the object (as an example, object y1), in a standard HTTP message, including in the header the expiration date of the object. The Proxy cache server saves the object in it local disk, updates the cache index, stores the expiration date, correlates it to the corresponding object and propagates the object to the client device. Later on, another request for the same object (y1) is issued by another client device or by the same client device (310). The Proxy cache server processes the request and finds the object in its cache. The Proxy cache server returns the requested object to the client device. A long time after a new request is issued for the same object (y1) by any client device (320). The Proxy cache server processes the request and finds the object in its cache but the expiration date is exhausted. The Proxy cache server sends a special request "if -modified-since" with the last modified date extracted from the cache index (210) to the Web content server. The Web content server verifies if the time stamp of the object has been modified. If not, a response indicating that the object has not been modified is sent back to the Proxy cache server and the Proxy cache server sends back the object (y1) retrieved from its cache after updating the expiration date in its cache index, if necessary. If yes, the Web content server sends back to the Proxy cache server the newly updated object (y1). The Proxy cache server replaces the old object by the new one on it local disk, updates the cache index entry for this object with the new expiration date and last modified date, then sends back the object to the client device. It is noted that, according to the HTTP protocol, the Web content server when sending the answer to the Proxy cache server, includes in the HTTP header a code 200, in the example, indicating that the object has been changed. If the code is 304, the object has not been changed. These same HTTP codes, as described later in the document in reference to FIG. 4 and FIG. 9 are used also in the syntax of the commands in the preferred embodiment to advise of the same situations. In the preferred embodiment, these codes are used inside the data field of an HTTP message and not in the HTTP header.

FIG. 4 shows the flows between client device and Proxy cache server and between the Proxy cache server and a Web content server in case where the cache refresh agents (160, 170) have been installed on the Proxy cache server and the Web content server.

The client device requests an object (as an example, URL "www.yahoo.com/y1") (430) from its browser through the existing HTTP command, if the HTTP protocol is used. The Proxy cache server performs a lookup in its cache index and does not find the object, so, it re-sends the request to the target Web content server or to an other Proxy cache server in case of cascaded Proxy cache servers. The Web content server which has the Proxy cache agent installed and operational returns to the Proxy cache server the object (as an example, object y1) with a code in the HTTP header indicating that the cache refresh agent is active (Refresh_agent=yes) and giving the object signature. The use of header to carry additional information is an optional possibility of the HTTP protocol. If there is no agent able to read the HTTP header, this information is simply ignored. In RFC 2616 the field 'signature' can be added in the 'Entity Field Header' (see Chapter 7.1 of the referenced RFC) and the 'Refresh_agent' field can be added in the 'Response header field' (see RFC, Chapter 6.2).

It is noted that the 'object signature' is already part of the header as defined in the RFC protocol but another use. This field is not used in the preferred embodiment because, this would prevent the implementation of the 'Refresh_request' and 'Refresh_response' commands applied to a list of objects (Object_list) as described in reference to FIG. 6, later in the document.

The Proxy cache server saves the Web content server name originating the object in the Web_contentServer_table (200) if it is not yet stored and sets cache_refresh_agent_active indicator to "yes", saves the object in it local disk, creates a cache index entry for this object with the signature, and expiration date and propagates the object to the client device. Later on, another request for the same object (y1) is issued by an other client device or by the same client device (440). The Proxy cache server processes the request and finds the object in its cache. The Proxy cache server returns the requested object to the client device. A long time after, a new request is issued for the same object (y1) by any client device (450). The Proxy cache server processes the request and finds the object in its cache but the expiration date is exhausted. The Proxy cache server, using the Web_contentServer_table(200), identifies that the target Web content server has a cache_refresh_agent active. The Proxy cache server sends a request refresh to the Web content server cache_refresh_agents giving the object identifier and its signature extracted from the cache index (210). The Web content server verifies if the signature of the object has been modified. If not, a response indicating that the object has not been modified ("not modified" code 304) is sent back to the Proxy cache server and the Proxy cache server sends the object (y1) retrieved from its cache to the client device. If yes, the Web content server sends back in its Refresh_response command to the Proxy cache server the newly updated object (y1) with the new signature (Sy12) as well as the expiration date (in the example of FIG. 4, "2002/08/12") and a status code which is "200" in the example of FIG. 4 and means that the object has been modified. The Proxy cache server replaces the old object by the new one on its local disk, updates the cache index entry for this object with the new signature and new expiration date, and sends back the object to the client device.

The Refresh_request and Refresh_response commands as well as their arguments are conveyed in the payload of the HTTP message or the payload or any other type of message under a different protocol.

The "200" code as the other codes used in the Refresh_response command of the preferred embodiment are conveyed with the command itself in the data part of the HTTP message. However, in the preferred embodiment are the same codes than the codes conveyed in the HTTP header of the HTTP messages according to the HTTP 1.1 protocol described in the RFC 2616, for instance. Any other code can be used as a different embodiment, however the cases considered are always the same. The list of all the possible codes, their meaning and their use are illustrated in FIG. 9. As just seen in the example of FIG. 4, the "200" code means that the object has been modified. In the Refresh_response from the Web content server, with this code, are carried the Object ID, the expiration date, the object signature and the object itself. Upon reception of a Refresh_response command including these information, the Proxy cache server updates the Cache_index_table with the new signature, new expiration date corresponding to the object and sends the new version of the object to the client device. This is the normal completion of a refresh operation that the Proxy cache server executes as described above in reference to the example of FIG. 4. The code "304" means that the object has not been modified; the Refresh_answer includes in this case "/y1",304,"2002/08/12", which is the Object_ID, the 'not modified' code and the new expiration date. When receiving this code, the Proxy cache server sends back to the client device the object it had already stored in its auxiliary memory and updates the expiration date corresponding to this object in its Cache_index_table. The code "404" means that the object has not been found and no other information in the Refresh_response command is carried with this code. Upon reception of this code, the Proxy cache server sends the 404 code to the browser of the client device. The codes 301, 302 and 307 mean that the object has been moved from the Web content server to another Web content server. Code 301 means that the move is permanent. Code 302 means that the move has been done to a new URL and a new request is created and sent to the new URL without the user seeing it. Code 307 means that the object was only temporarily moved to another Web content server. The Refresh response command carries this code with the new URL. Upon reception of this answer from the Web content server, the Proxy cache server removes the entry from the cache index. Then, according to the standard HTTP protocol the Proxy cache server sends to the Client device the HTTP message defined in the protocol which conveys the code in the HTTP header.

FIG. 5 illustrates the update of the Cache_index_table which is maintained in the Proxy cache server. The table comprises the Object_ID and the signature of the Object. The current Cache_index_table contains the last level of information received from the content server. The signature has been initially computed by the content server. Upon a request for refresh sent by the Proxy cache server, the Web content server selects the objects to be downloaded to the Proxy cache server, the syntax of the request and answer being illustrated in reference with FIGS. 8 and 6. When the Proxy cache server receives the object list sent by the Web content server, the local object versions are updated, the Proxy cache server updates also the Cache_index_table with the Object_ID, Signature, the new expiration date and the last modified date, accordingly. In FIG. 5 the first table (500) is the previous level before refresh and the second table (510) is the last level after refresh. In the new level of the Cache_index_table (510), the signature of the newly received objects X3 and X4 have been changed (512, 513). It is noted that the refresh operation applied to one object and as described in reference to FIG. 4, implies the update of one line only in the Cache_index_table.

Figure 6:
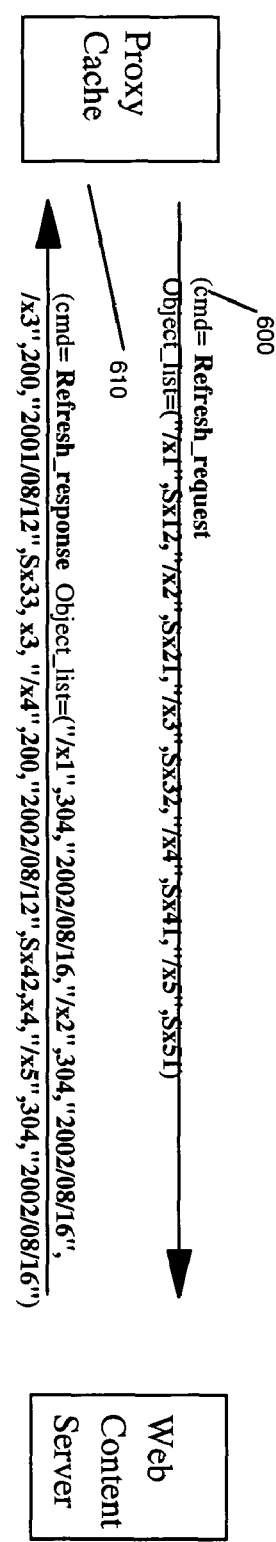
FIG. 6 is an illustration of the exchange of information between the Proxy cache server and a Web content server according to the preferred embodiment for a refresh operation.

FIG. 6 illustrates the messages exchanged between the Proxy cache server and the Web content server for a refresh operation applying to one or more objects for which the expiration date has been exhausted. Such a refresh operation can be requested by the Proxy cache server for at least one during a planed refresh operation started, for instance, once a day, during the night. The Proxy cache server requests to refresh the objects which are locally stored.

The protocol used in the preferred embodiment is HTTP. The command sent by the Proxy cache to a designated Web content server to initiate the refresh is a 'Refresh_request' (600). The arguments of this command are a list of Object_ID and their associated signatures read in the Cache_index_table stored in the Proxy cache server. The objects of the object list are those for which the expiration date is exhausted and which are assigned to the given Web content server. The command and its arguments are conveyed in the payload of a standard HTTP message. Any other possible protocol than HTTP can be used as it provides also a possibility to convey the commands according to the preferred embodiment in the payload of messages.

Upon reception of that request, the Web content server decides what are the objects in list of objects submitted by the Proxy cache server, which need to be updated. To do so, the Web content server retrieves or calculates the signatures for the objects it stores and which are referenced in the request issued by the Proxy cache server. If the signature is the same than the signature included in the request from the Proxy cache server, the Web content server will not send this object in its answer. In the example, x1, x2 and x5 have not a different signature (respectively Sx12, Sx21 and Sx51) and a new version will not be sent by the Web content server. x3 and x4 locally stored by the Proxy cache server corresponds to a level identified by the signature Sx32 and Sx41. In the server, the level stored has the signature Sx33 and Sx42 which is different. The current level of x3 and x4 must be sent for refresh to the Proxy cache server. The answer (610) from the Web content server is illustrated as well in FIG. 6. Using HTTP protocol, the Web content server sends in the payload of the message an answer to the Refresh_request of the Proxy cache server. The command is 'Refresh_response' followed by the 'Object_list' according to the format described in reference to FIG. 8. X3 and x4 are sent with the updated signature, Sx33 and Sx42, the new objects length and the objects content themselves. The format of the message may be a text, length, value (TLV format), or an XML tagged message or anything else.

When the Proxy cache server receives the Refresh_response from the Web content server it updates the Cache_index_table accordingly. The update of the Cache_index_table corresponding to the example of commands in FIG. 6 is described in FIG. 5.

Figure 7:
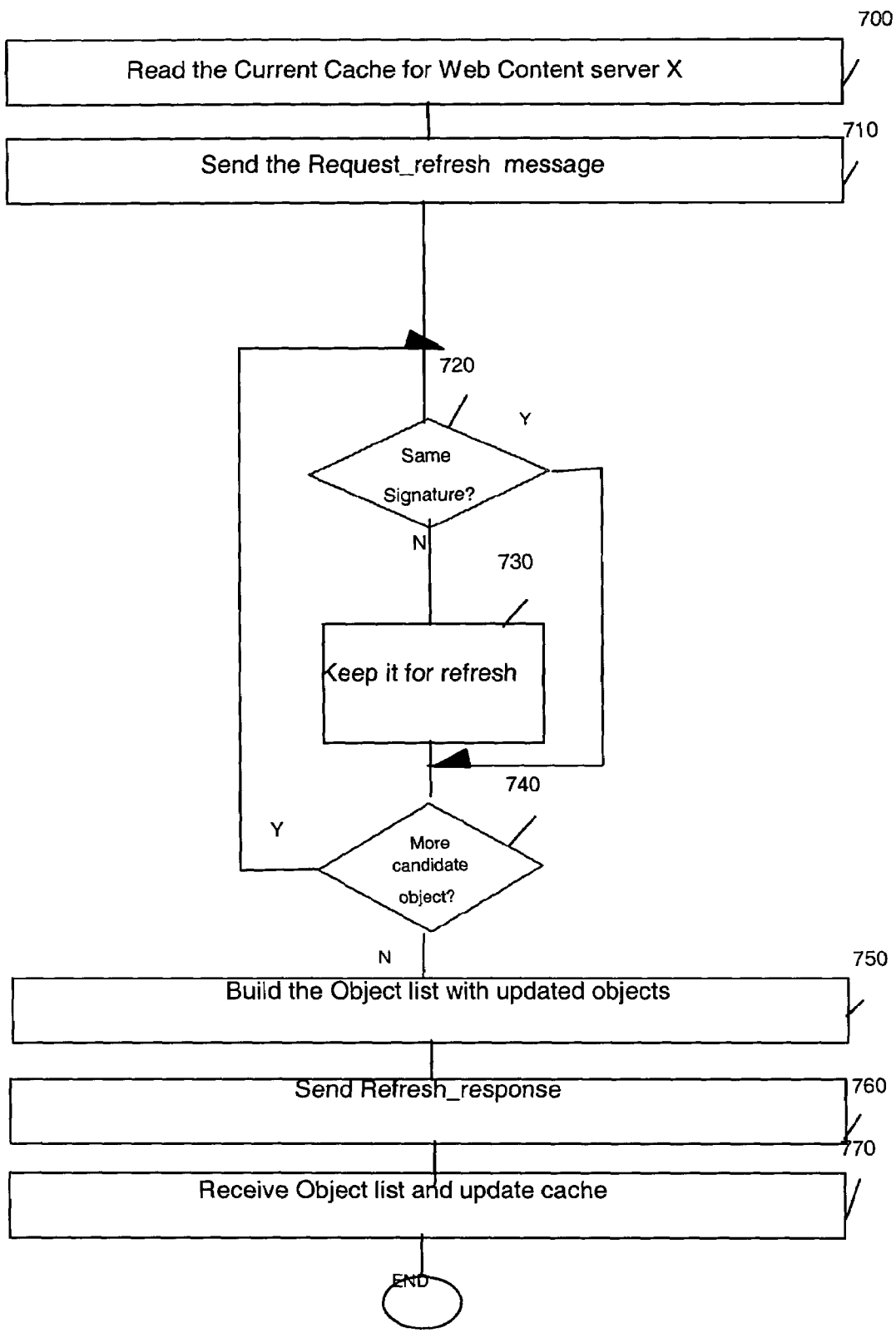
FIG. 7 is the flow chart of the method to refresh the Proxy Cache server from the Web content servers according to the preferred embodiment for a refresh operation.

FIG. 7 is the flowchart of the method for refreshing a set of objects in the Proxy cache server according to the preferred embodiment.

Assuming that the Proxy cache server starts a refresh operation which may be scheduled each night, step 700 is performed by the Proxy cache server which reads the Cache_index_table for a given Web content server storing the couples (Object_ID, signature). The Proxy cache server posts a message for instance, under the HTTP protocol (710) used in the Internet network, the 'Post message' being the client request in the client-server environment supported by HTTP. The message comprises the 'Request_refresh' command according to the format described in reference to FIG. 6. It includes the couples read in.

The Web content server calculates the signature of the first object candidate to be updated in the received request or reads this signature if it has been already stored in the server. If the signature is not the same than in the Request_refresh message from the Proxy cache server (answer No to test 720), then, the object is kept (730) for the refresh operation. If the signature is the same (answer Yes to test 720), the next object is read in the list of objects sent by the Proxy, if there are no more objects to check (answer no to test 740), the server prepares the object list. If there are more objects, (answer yes to test 740), the signature of the just read object is checked against the signature of the object saved in the Web content server (720), and the same loop (720, 730, 740) is performed until there is no more object to be read in the list.

The Web content server first builds the object list with the objects to be updated (750). As described in reference to FIG. 8, the object list comprises for each object the Object_ID, the Object signature, the code, the expiration date and the Object content itself as stored in the Web content server. The Web content server sends the response to the request for refresh (760) using the client-server HTTP protocol. The Proxy cache server receives the object list and is able to read for each object the Object_ID, the Object signature, the code, the expiration date and read the Object content. With the information received, the Proxy cache server updates the Cache_index_table with the Object_ID, the corresponding signature and the new expiration date as well as the last modified date. Then, the content of the objects themselves are replaced in its local storage with the last level sent.

Figure 8:
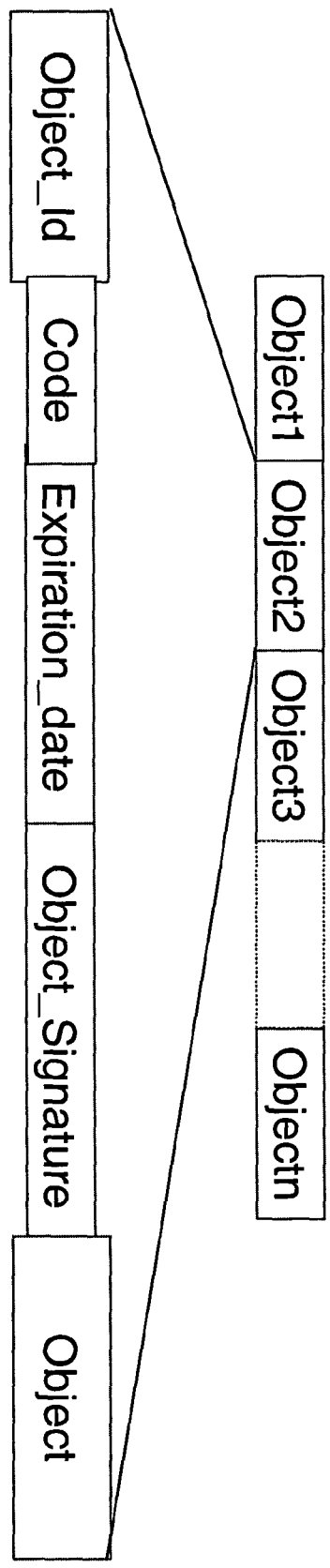
FIG. 8 shows the format of object lists downloaded to the Proxy cache server by the Web content server according to the preferred embodiment.

FIG. 8 illustrates the format of the object list that the Web content server will download to the Proxy cache server to refresh it with the Refresh_request and Refresh_response commands as described in FIG. 6. This object list, as the commands themselves, are sent in the payload of a HTTP message. A variable list of objects is sent in one message, in the example of FIG. 8, n objects are downloaded from Obj1 to Objn. Each 'Object' of the object list comprises the Object_ID, the Object_Signature, the expiration date and the code which is the last level of signature from the Cache_index_table, and the Object itself which has been read from the origin content server.

Figure 10:
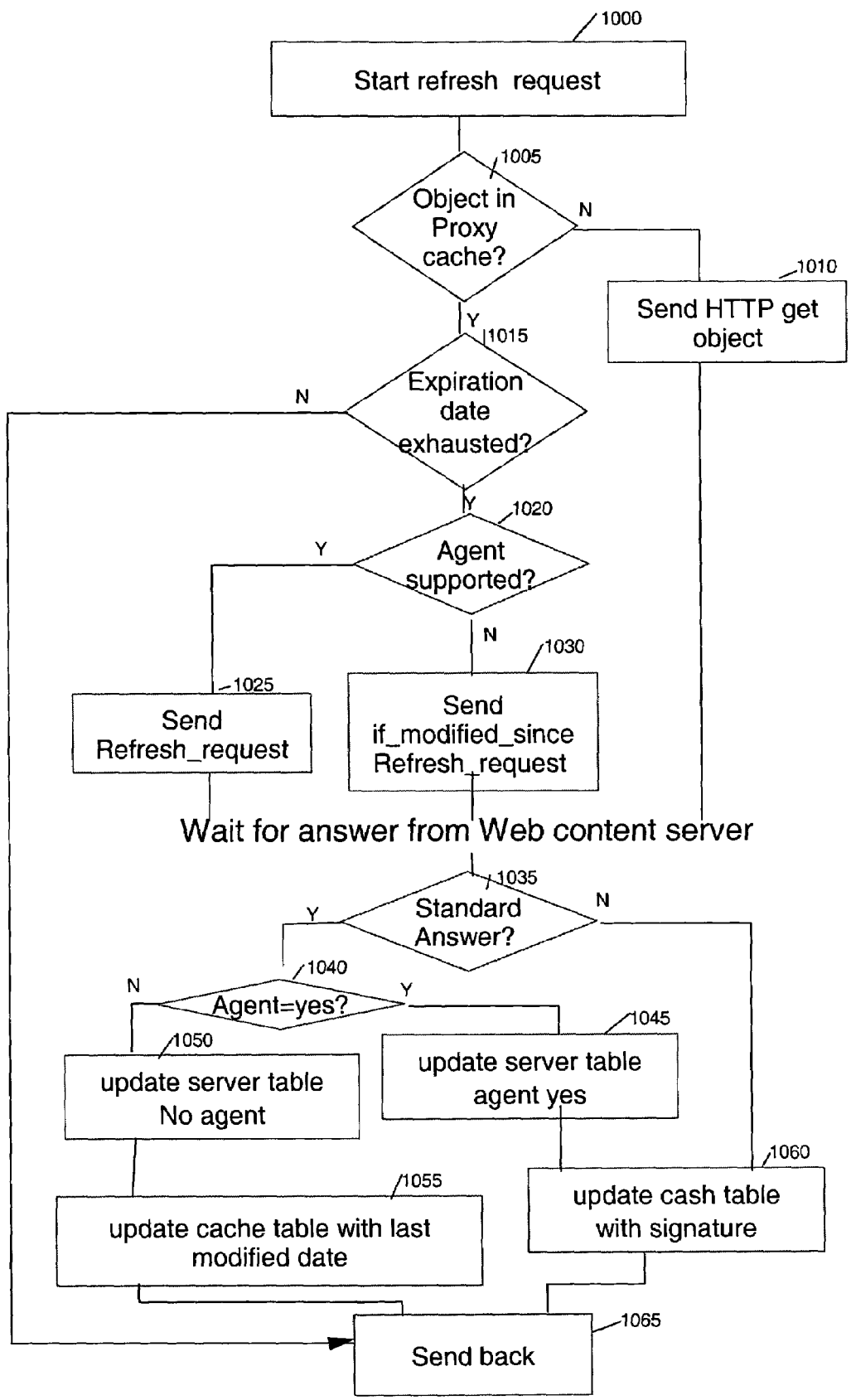
FIG. 10 is the flow chart of the method operating on the Proxy cache server for refresh of one object initially requested by a client device browser according to the preferred embodiment.

FIG. 10 is the flow chart of the method operating on the Proxy cache server for refresh of one object initially requested by a client device browser according to the preferred embodiment. The first step (1000) consists in the reception by the Proxy cache server of one request from the browser of a client device for obtaining one object. The request is standard under the protocol used, the HTTP protocol in the preferred embodiment. The second step performed in the Proxy cache server is to check if the object requested is already stored in the Proxy cache server. If the answer is no, (answer No to test 1005) the Proxy cache server sends a request (1010) to get this object from the Web content server corresponding to the URL received. The Proxy cache server waits for the answer from the Web content server because the protocol used in the preferred embodiment works in request/answer mode. In this case the Web content server will send a standard answer under the protocol. The answer to the test 'Standard answer?' (1035) is yes. The Proxy cache server analyzes (1040) if there is an indication 'Refresh_agent=yes' in the header of the HTTP message received as answer in the preferred embodiment. If there is not such an indication (answer No to test 1040), this means that the Web content server which answered has no ServerCache_refresh agent installed. The Proxy cache server stores (1050) this information in the Web_Content_server_table and updates (1055) the Cache_index_table with the last modified date which is the date (or the timestamp) of the reception. If the header of the standard answer from the Web content server includes the mention of 'Refresh_agent=yes' (answer Yes to test 1040), the Proxy cache server updates the Web_content_server_table with this information (1045), reads the signature and object and creates an entry in the Cache_index_table (1060) with this information about the object. When the standard answer has not been sent, this means that a non standard Refresh_request has been sent by the Proxy cache server. The answer to the test 'Standard answer' (1035) is No. In this case, the Proxy cache server reads the 'Refresh_response' of the Web content server according to the syntax as described in reference to FIG. 4 and updates the Cache_index_table with the information about the object (1060). The last step for all the cases described above is to send back (1065) the object in the standard way under the protocol used to the browser of the client device.

The other case supported by the Proxy cache server receiving the request for refresh (1000) from the browser of the client device is when the object is already stored in the auxiliary memory of the server (answer Yes to test 1005). In this case, the server checks if the object version is still valid. If the Expiration date stored in the Cache_index_table for this object identified by its URL is not exhausted (answer no to test 1015), the Proxy cache server sends (1065) to the client device the object it has in memory in a standard way (HTTP message if the protocol used is HTTP). If the expiration date indicated in the Cache_index_table is exhausted (answer yes to test 1015), the Proxy cache server has to request a new version of the object to the Web content server storing this information. The Proxy cache server first reads the URL of the Web content server in the Cache index_table and checks (1020) in the Web_content_server_table if the Server cache refresh agent is supported by this Web content server (yes or No in the Agent support column for this Web content server).

If the agent is not supported (answer no to test 1020), the Proxy cache server sends a request for one object as with the prior art based on the 'if-modified_since' date (1030). If the agent is supported (answer yes to test 1020), the Proxy cache server sends a request (1025) for one object as described in reference to FIG. 4 based on the signature of the object. The Web content server, if a Server cache refresh agent is not active will send a standard answer as described in reference to FIG. 3. If the Web content server has a Server cache refresh agent active, it will send an answer according to the preferred embodiment based on the signature of the object and only if the signature has changed as described in reference to FIG. 4.

Figure 11:
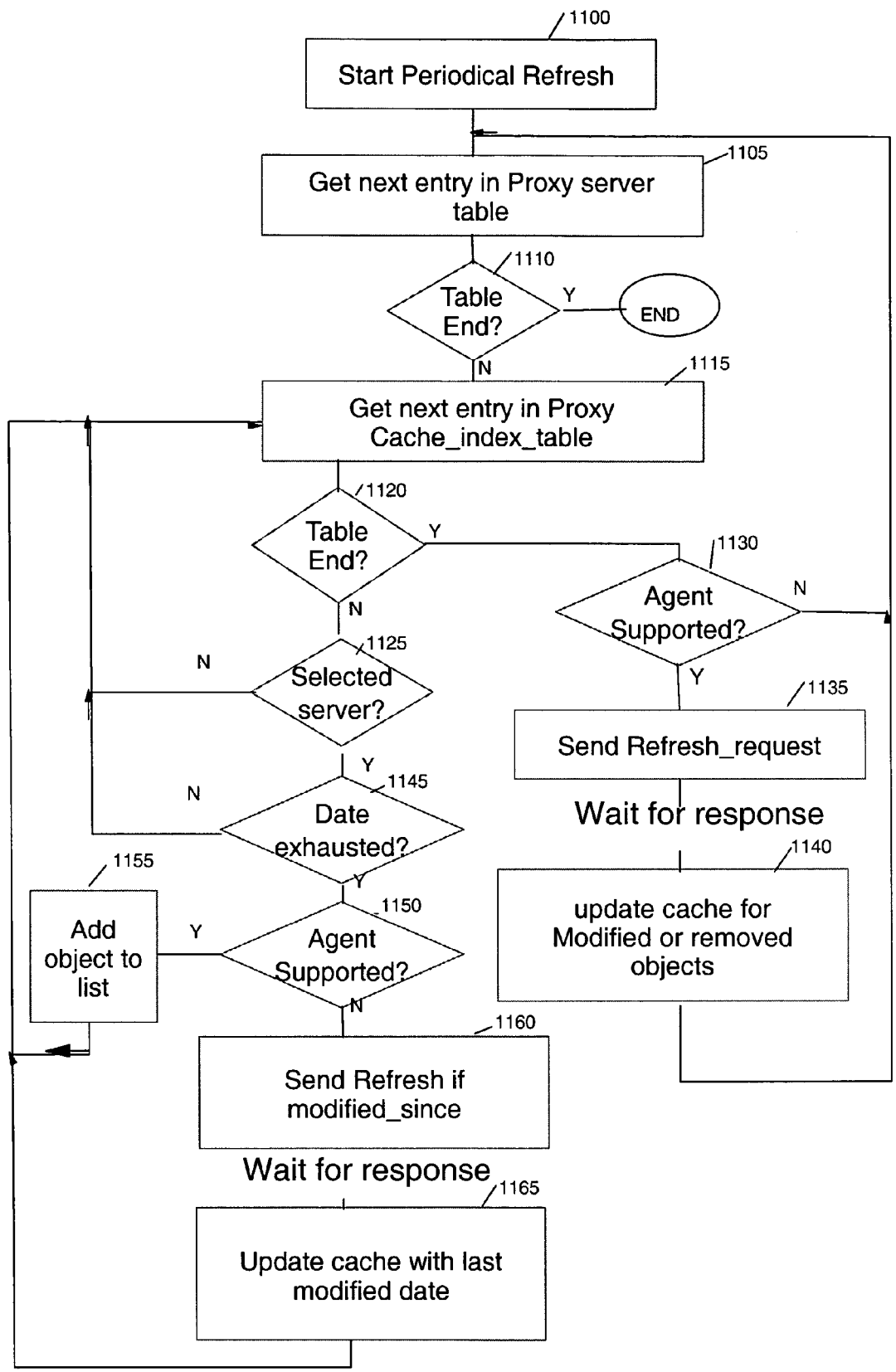
FIG. 11 is the flow chart of the method operating on the Proxy cache server for refresh of a list of objects as initiated by the Proxy cache server according to the preferred embodiment.

FIG. 11 is the flow chart of the method operating on the Proxy cache server for refresh of a list of objects as initiated by the Proxy cache server according to the preferred embodiment. The method supports the standard Web content servers refreshing the object on the base of 'modified_since' as described in FIG. 3. The method supports also the Web content server operating the Server Cache refresh agent according to the preferred embodiment as described in FIG. 4. The first step is to start from the Proxy cache server a periodical operation of refresh (1100). The Proxy cache server reads the Web_content_server_table (1105). If there is no more entry the method ends (answer No to test 1110). If an entry corresponding to one Web content server is read (answer yes to test 1110), the Cache_index_table is read (1115) to look for the entries corresponding to this Web content server. The object having an expiration date exhausted are selected to be refreshed for this server. If the end of the table is reached (answer yes to test 1120), the type of Web content server which has been read in the Web_content_server_table (1105) is analyzed. If the Web content server supports the Server cache refresh agent (answer yes to test 1130), a Refresh_request having the syntax as described in reference to FIG. 6 is sent (1135) to the Web content server. When the response is received from the Web content server in the Refresh_response command as described in reference to FIG. 6, the Cache_index_table is updated (1140) with modified or removed objects according to the arguments of Refresh_response command. The next entry in the Web_content_server_table is read (1105).

If the end of the Cache_index_table is not reached (answer No to test 1120), the field URL is read and if the entry does not correspond (answer No to test 1125), to the URL of the Web content server read in the Web_content_server table (1105), a new entry in the Proxy Cache_index_table is read (1115). If the URL is correct (answer yes to test 1125), the field 'expiration date' of the entry is read. If the date is not yet exhausted (answer No to test 1145), a new entry in the Proxy Cache_index_table is read (1115). If the date is exhausted (answer yes to test 1145) the entry in the Web_content_server_table which has been read (1105) is analyzed. If the 'agent support' field is set to yes in the record read, this means that the Server cache refresh agent is supported in the web content server. The object information read in the Cache_index_table entry is used to add the object and signature to (1155) the Object_list, according to the syntax of the Refresh_request command as described in reference to FIG. 6. Then, a next entry is read (1115) in the Cache_index_table. If the Web content server does not support the Server cache refresh agent (answer No to test 1150), A standard 'Refresh if modified since' request is sent (1165) for that object to the Web content server, using the syntax as described in reference to FIG. 3. When a standard answer is sent by the Web content server, still as described in reference to FIG. 3, the Cache_index_table is updated (1165) for this entry with the information received by the Web content server. In a normal case, the code is 200 and the object is sent with or without an expirations date. A new entry is then read in the Cache_index_table (1115).

The method described by the flow charts of FIG. 10 and FIG. 11 is implemented in the preferred embodiment by a software, the Client cache refresh agent, executed on the Proxy cache server and operating with the operating system of the server.

Figure 12:
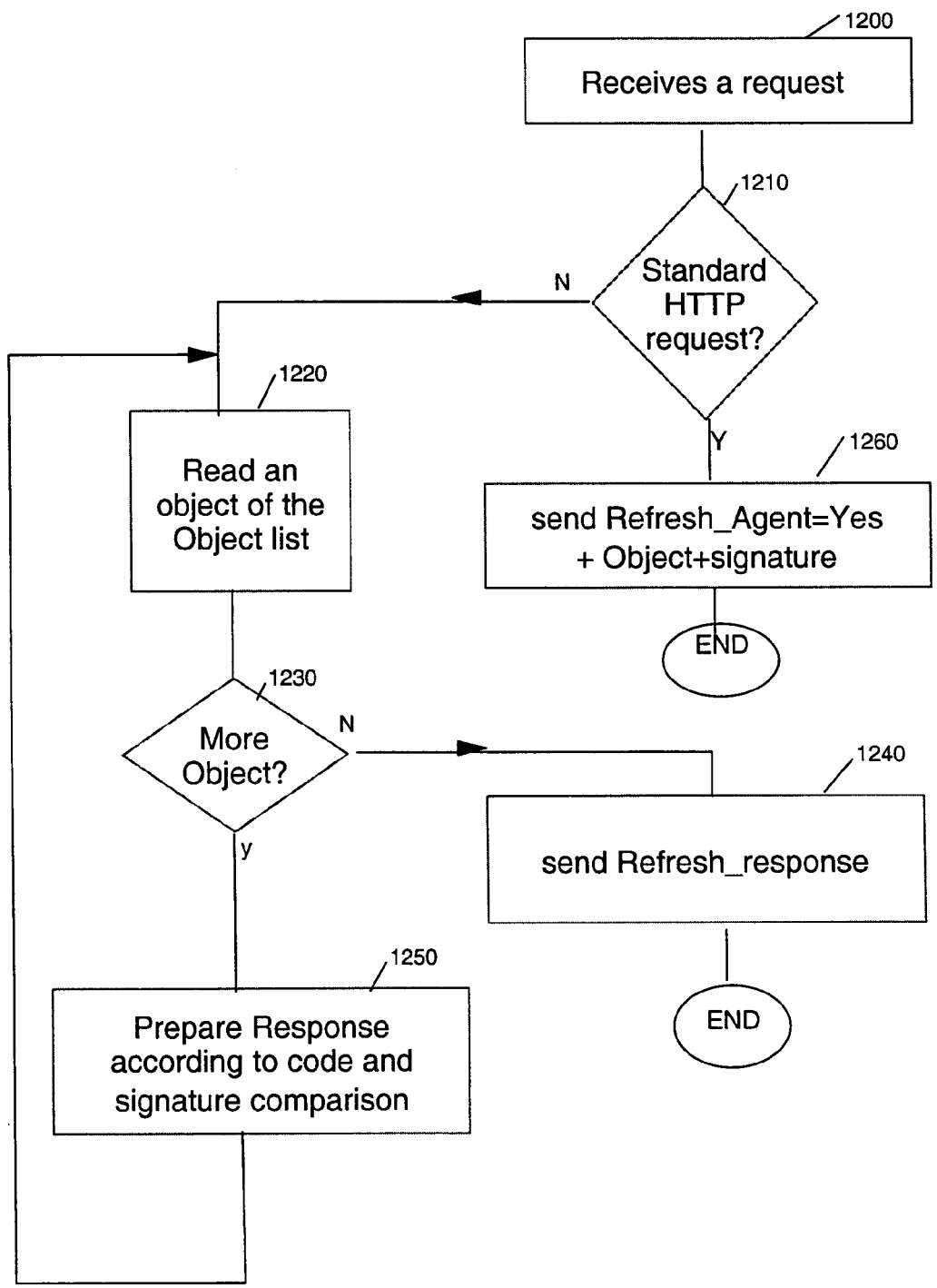
FIG. 12 is the flow chart of the method operating on the Web content server answering the request for refresh of one object or of a list of objects sent by the Proxy cache server according to the preferred embodiment.

FIG. 12 is the flow chart of the method operating on the Web content server answering the request for refresh of one object or of a list of objects sent by the Proxy cache server according to the preferred embodiment. As the Web content server operates the Server cache refresh agent according to the preferred embodiment, it first receives a request for refresh (1200) which is sent by the Proxy cache server either for one object (1010, 1025, 1030 and 1160 depending if the Proxy cache servers knows if the Web content server has an agent or not), or for an object_list (1135). If the request received is a standard HTTP message (answer yes to test 1210) this means that the Proxy cache server does not have this object stored and does not know that the Web content server has the Server cache refresh agent installed. The Web content server sends back an HTTP message (1260) including in the header the object requested, its signature that it computes and stores and the indication 'refresh_agent=yes'. The method ends.

If the Web content server receives a non-standard HTTP message (answer No to test 1210), this means that the Proxy cache server has this object stored in its auxiliary memory. The Web content server receives a request for refresh having in the message payload a Refresh_request command. The first object of the Request_refresh command is read with its signature. If there is no more object (answer no to test 1230), a Refresh_response is prepared as described in reference to FIG. 4. The Web content server sends the object back only if the signature read in the request_refresh has changed in comparison to the signature computed or stored in the Web content server. The code used is 200. If the signature has not changed, the object is not sent and the code is 304. Other cases may occur such as the case where the object is deleted, object not found as described sooner in the document in reference to FIG. 9. Finally, the Web content server builds the Refresh_response according to the syntax as described in reference to FIG. 4 and the method ends. If there are more than one object (answer yes to test 1230), the Web content server identifies the objects in the Object list for which the signature has changed and sends back a Refresh_response (1250) according to the syntax as described in reference to FIG. 6.

The method as described with the flow chart of FIG. 12 is implemented as a software, the Server cache refresh agent, executed on the Web content server and operating with the operating system of the server.

The invention claimed is:

1. A method for refreshing objects stored in a Proxy cache server, with new versions of the objects stored by Web content servers communicating by messages through a network with the Proxy cache server, the Proxy cache server and the Web content servers supporting a standard request for one object and a standard refresh request for one object based on a last modified date, said method comprising the steps of:

storing, in the Proxy cache server, a cache index table containing, for each object stored, an identifier of the object, a file name of the object in the Proxy cache server, a network address of a Web content server owning the object, an object validity expiration date and a signature identifying a content of the object;

reading the cache index table, and selecting one object for which the object validity expiration date is exhausted;

sending from the Proxy cache server to the Web content server owning the selected object, a Refresh_request command in a first payload of a first message, an argument of the first message being the object identifier and an object signature;

receiving from the Web content server a Refresh_response command in a second payload of a second message, arguments of the second message being the object identifier and, if the signature of the object stored in the Web content server is different from the signature in the Refresh_request command, the object stored in the Web content server, a new object signature and a new expiration date;

updating, in the Proxy cache server, the cache index table with the new object signature and the new expiration date of the object and updating the object file name with the object stored in the Web content server;

sending from the Proxy cache server a standard request for the one object;

receiving a third message back from the Web content server containing the object requested and the last modified date of the object;

if the third message further contains the object signature and an indication that the Web content server supports a Refresh_request command, updating, in the Proxy cache server, a Web content server table containing, for each Web content server having already sent to the Proxy cache server one object, the network address of the Web content server and the indication that the Web content server supports the Refresh_request command;

if the third message does not further contain the object signature and the indication that the Web content server supports the Refresh_request command, updating in the Proxy cache server, the Web content server table with another indication that the Web content server does not support the Refresh_request command and updating the cache index table with the last modified date of the object;

updating, in the cache index table, the object file name containing the object stored in the Web content server and the object expiration date.

2. The method of claim 1 wherein the step of reading the cache index table is repeated for all the objects of the cache index table for which the expiration date is exhausted;

the sending from the Proxy cache server to the Web content server owning the selected object step is performed once for all the selected objects owned by a same Web content server, to said same Web content server address, the Refresh_request command arguments being a list of couples comprising the object identifier and its signature for all the selected objects;

the receiving from the Web content server a Refresh response command in a second payload of a second message step is performed once for all the selected objects, the Refresh_response arguments being a list of quadruplets, for each selected object for which the signature of the version stored in the Web content server is different from the signature in the Refresh_request, the object identifier, the object stored in the Web content server, its signature and the new expiration date;

the updating in the Proxy cache server step is performed on the Proxy cache server for all the objects received in the list with the Refresh_response command.

3. The method of claim 1 further comprising the steps of:

before sending any Refresh_request command for at least one object to a Web content server, checking in the Web content server table the indication if the Web content server supports the Refresh_request command;

if the indication that the Web content server supports the Refresh_request command is stored in the Web content server table, sending a Refresh_request command for the at least one object;

if the indication that the Web content server does not support the Refresh_request command is stored in the Web content server table, sending a standard request refresh for each of the at least one object based on its last modified date.

4. The method of claim 1 further comprising the steps of:

upon reception of the Refresh_request command from the Proxy cache server, sending a Refresh_response command in the second payload of the second message to the Proxy cache server, arguments for the second message including, for each of the objects identified in the Refresh_request command, the object identifier and, if the signature of the object stored in the Web content server is different from the signature in the Refresh_request command, the object stored in the Web content server, the new object signature and the new expiration date.

5. The method of claim 1 further comprising the steps of:

receiving the standard request for the one object from the Proxy cache server;

sending the third message to the Proxy cache server with the one object, said third message further containing the object signature and the indication that the Web content server supports the Refresh_request command.

6. The method of claim 1 wherein the Refresh_response command sent by the Web content server has an additional argument which is a status code associated with each object, one possible code value being that the object is modified, one other possible code value being that the object is not modified and one other possible value being that the object is not found, said Proxy cache server not updating the object nor modifying an entry corresponding to this object in the cache index table if the code value received in the Refresh_response is that the object is not modified, said Proxy cache server deleting the entry corresponding to this object in the cache index table if the code value received in the Refresh_response is that the object is not found.

7. The method of claim 6 wherein all the possible code values are HTTP protocol code values, the Proxy cache server updating the cache index table and the Web content server table according to the code values.

8. The method of claim 1 wherein the messages are sent under HTTP protocol.

9. The method of claim 1 wherein the object signature and the indication that the Web content server supports the Refresh_response command are sent by the Web content server in an HTTP message header, the object itself being sent in an HTTP message payload according to HTTP protocol.

10. A computer program stored on a computer readable medium comprising programming code instructions which when executed, enables a computer system to implement a method for refreshing objects stored in a Proxy cache server, with new versions of the objects stored by Web content servers communicating with messages through a network with the Proxy cache server, the Proxy cache server and the Web content servers supporting a standard request for one object and a standard refresh request for one object based on a last modified date, said programming code instructions comprising:

storing, in the Proxy cache server, a cache index table containing, for each object stored, an identifier of the object, a file name of the object in the Proxy cache server, a network address of a Web content server owning the object, an object validity expiration date and a signature identifying a content of the object;

reading the cache index table, and selecting one object for which the object validity expiration date is exhausted;

sending from the Proxy cache server to the Web content server owning the selected object, a Refresh_request command in a first payload of a first message, an argument of the first message being the object identifier and an object signature;

receiving from the Web content server a Refresh_response command in a second payload of a second message, arguments of the second message being the object identifier and, if the signature of the object stored in the Web content server is different from the signature in the Refresh_request command, the object stored in the Web content server, a new object signature and a new expiration date;

updating, in the Proxy cache server, the cache index table with the new object signature and the new expiration date of the object and updating the object file name with the object stored in the Web content server;

sending from the Proxy cache server a standard request for the one object;

receiving a third message back from the Web content server containing the object requested and the last modified date of the object;

if the third message further contains the object signature and an indication that the Web content server supports a Refresh_request command, updating, in the Proxy cache server, a Web content server table containing, for each Web content server having already sent to the Proxy cache server one object, the network address of the Web content server and the indication that the Web content server supports the Refresh_request command;

if the third message does not further contain the object signature and the indication that the Web content server supports the Refresh_request command, updating in the Proxy cache server, the Web content server table with another indication that the Web content server does not support the Refresh_request command and updating the cache index table with the last modified date of the object;

updating, in the cache index table, the object file name containing the object stored in the Web content server and the object expiration date.

11. The computer program of claim 10, said programming code instructions further comprising:

upon reception of the Refresh_request command from the Proxy cache server, sending a Refresh_response command in the second payload of the second message to the Proxy cache server, arguments for the second message including, for each of the objects identified in the Refresh_request command, the object identifier and, if the signature of the object stored in the Web content server is different from the signature in the Refresh_request command, the object stored in the Web content server, the new object and its signature and the new expiration date.

* * * * *